United States Patent [19]

Fisher

[11] 4,253,857
[45] Mar. 3, 1981

[54] APPARATUS FOR SEPARATING AN ENTRAINED SOLID FROM A GAS

[75] Inventor: C. Donald Fisher, Muncy, Pa.
[73] Assignee: Koppers Company, Inc., Pittsburgh, Pa.
[21] Appl. No.: 82,301
[22] Filed: Oct. 5, 1979
[51] Int. Cl.³ .......................................... B01D 45/14
[52] U.S. Cl. ...................... 55/400; 55/430; 55/454; 55/460; 55/435; 55/470
[58] Field of Search ................ 55/396, 400, 401, 403, 55/408, 409, 428, 430, 460, 402, 404, 405–407, 435, 470, 454; 209/139 A; 210/373, 408

[56] References Cited

U.S. PATENT DOCUMENTS

| | | | |
|---|---|---|---|
| 756,342 | 4/1904 | Dulin | 210/373 |
| 815,674 | 3/1906 | Bent | 55/403 |
| 1,760,617 | 5/1930 | Whitmore | 55/460 |
| 2,441,631 | 5/1948 | Hills | 55/396 |
| 4,172,710 | 10/1979 | van der Molen | 55/403 |

FOREIGN PATENT DOCUMENTS 776917  6/1957  United Kingdom ........................ 55/396

*Primary Examiner*—David L. Lacey
*Attorney, Agent, or Firm*—Thomas F. Shanahan; Herbert J. Zeh, Jr.; Oscar B. Brumback

[57] ABSTRACT

In paper-making operations and the like, fibers of wood are frequently transported through piping as an entrainment in steam. An apparatus is disclosed for separating such entrainment and removing the fibers at one station and the steam at another station. Rotating blades give the entrainment a circular or rotating action whereby the heavier fibers move outwardly by centrifugal force to contact the wall from which the blades scrape the fibers and hurl them to discharge. The fiber-free steam is removed along an axial line perpendicular to the direction of movement of the separated fibers under the influence of a second set of blades.

8 Claims, 2 Drawing Figures

APPARATUS FOR SEPARATING AN ENTRAINED SOLID FROM A GAS

BACKGROUND OF THE INVENTION

1. Field of the Invention

This invention relates generally to the separation of solid particles that are entrained in gas from the entrainment gas and, more particularly, relates to the separation of the components of a gaseous stream which include wood fibers entrained in steam so as to obtain at separate stations the fibers free of steam and at another station the steam free of fibers.

2. Prior Art

In the manufacture of paper and the like, wood chips are subjected to a chemical action or to a combination of mechanical and chemical action and reduced to fine fibers. Conventionally, these fibers are then conveyed to a further processing station through a pipe at a velocity of between 5,000 and 30,000 feet per minute by means of steam.

When the entrained fibers arrive at the process station, it has been conventional to pass the entrainment of steam and fibers through a cyclone separator which separates the fibers from the steam. In such separators, the entrainment enters at the top tangentially and starts spinning downwardly of its own force. The centrifugal force separates the heavier fibers from the steam. The fibers leave at the bottom and the steam leaves at the top of the separator. Cyclone separators perform quite effectively until a layer of stationary fibers build up on the interior walls of the separator. When the weight of the stationary material on the wall is heavy enough to overcome the force of adhesion, the layer of material drops downwardly toward the bottom outlet of the separator. This falling layer of material can be so large and so thick as to block the discharge outlet of the separator. Even if the discharge outlet is not fully blocked, the erratic discharge of the material can adversely affect the performance of subsequent processing operations conducted on the material.

SUMMARY OF THE INVENTION

The present invention provides an independently powered apparatus for mechanically separating the components of an entrainment of solids in a gas. The apparatus includes two sets of blades that are rotated by means of a common drive shaft. The first set of blades, mounted in the solids separating portion of the housing, are the full diameter of the surrounding circular housing and are adapted to scrape the housing to prevent an accumulation of material on the interior walls of the housing. The first set of blades are driven at a speed to generate considerably more centrifugal force than a conventional cyclone separator and to impart such force to the entrained solids. The entrainment enters the housing tangentially at the outer circumference in the same direction as the rotation of the blades. The discharge of the solids from the housing is also tangential and on the opposite side from the entrance. The gas outlet is toward the center at a substantially lesser diameter than the diameter of the solid discharge and is displaced axially from the fiber discharge. Any solids tending to follow the gas component would have to move against the considerable centrifugal force generated by the rotating element. As an example, with a rotating element spinning at the rate of 1200 r.p.m. and having a diameter of three feet, the centrifugal force will be about 736 times the force of gravity. The solids would also need to travel axially to exhaust with the steam.

A second set of blades is mounted on the drive shaft axially spaced from the first set and on the opposite side of the gas outlet in the gas plenum to maintain a pressure differential between the solid separator portion and the gas plenum. The gas plenum may be of larger diameter than the solids separating portion of the housing. If the gas plenum is so designed, the second set of blades may be of a slightly larger diameter than the first set, thereby enhancing the pressure differential. It is understood it is not necessary that the second set of blades, being in the gas plenum, be of sufficient diameter to scrape the walls of the housing.

The apparatus of this invention is much smaller than the conventional al cyclone separator and will greatly simplify the installation of the separator between several pieces of equipment that it serves.

DESCRIPTION OF THE PREFERRED EMBODIMENT

Figure 1:
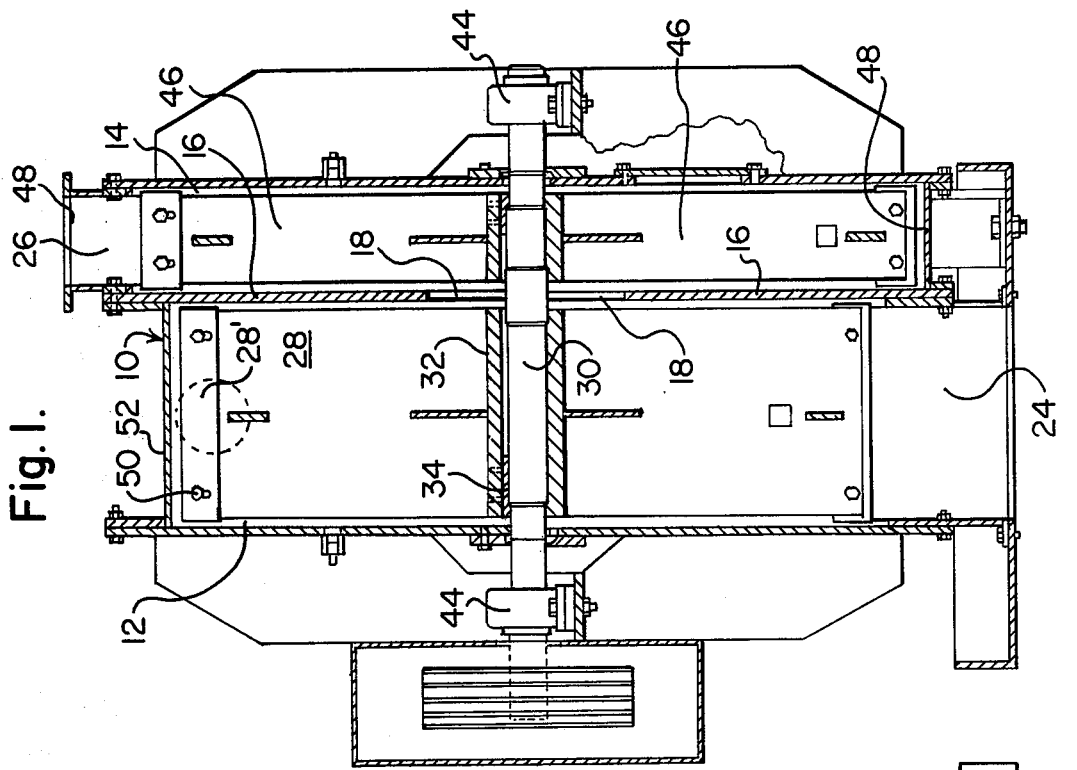
FIG. 1 is an elevational side, partially in section, of the invention.
Figure 2:
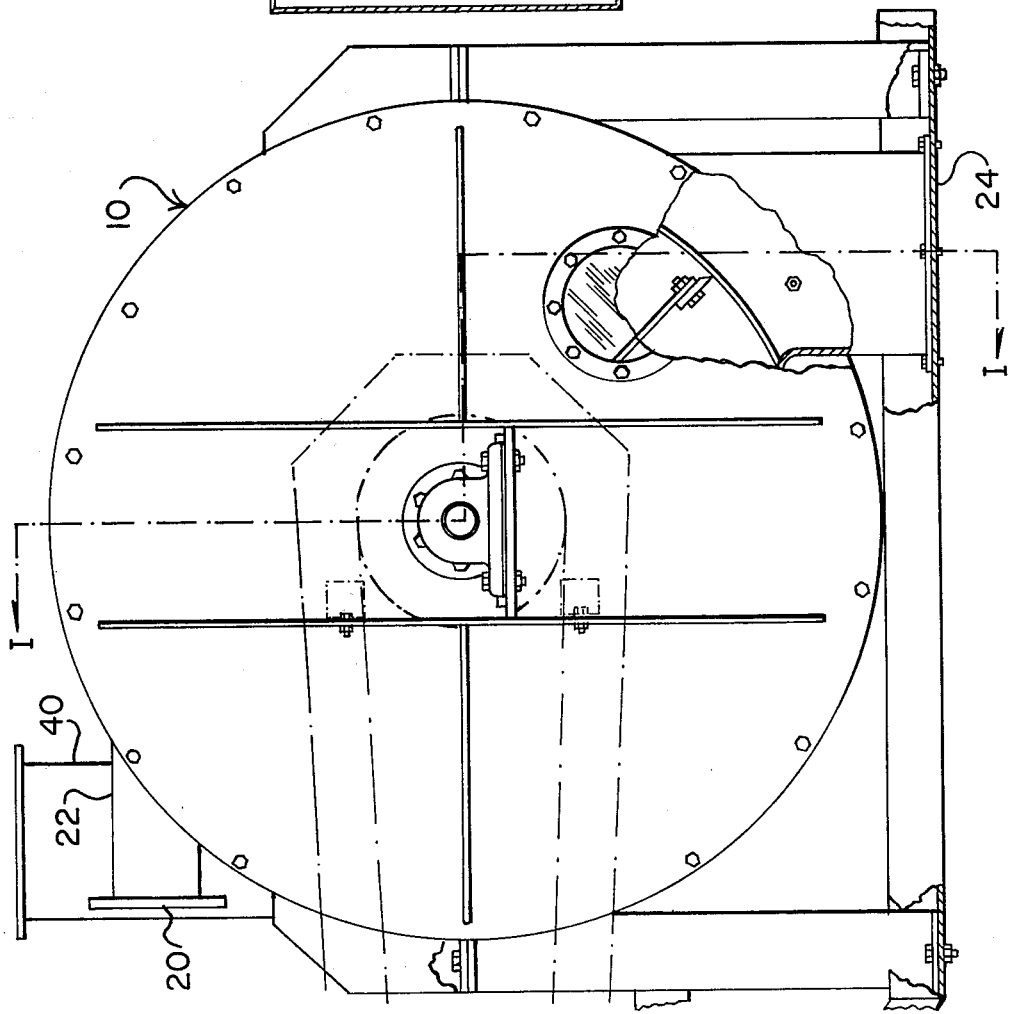
FIG. 2 is an elevational end view of FIG. 1.

Referring to FIG. 1, the closed housing 10 comprises two coaxially aligned cylindrical chambers 12 and 14 of different diameters and different widths. The separation of the fibers from the steam occurs in chamber 12, the solids separating portion of housing 10, and the steam is drawn into the chamber 14, the gas plenum portion of housing 10, for discharge. Dividing wall or plate 16, which divides chambers 12 and 14, has port 18 to permit passage of the steam from chamber 12 to chamber 14. The entrance for the entrainment, which is the steam with the entrained wood fibers, in the preferred embodiment is indicated at 20. This inlet permits the entrainment of fibers and steam to enter the housing at port 22, FIG. 2, at substantially the center of the width of the chamber 12 and to enter substantially tangentially to the circumference of chamber 12 at this point. The separated fibers are discharged from chamber 12 through opening 24 which extends the width of the chamber 12 and which also permits the fibers to be discharged and leave the separator with a tangential action. The steam exhausts through exhauster 26 that extends substantially the width of the chamber 14 at the top of the cylinder. The exhausting of the steam also occurs tangentially relative to chamber 14.

The entrainment entering chamber 12 through port 22 immediately contacts first blades 28. Blade 28 includes a blade tip 28' which is fixed to the blade by any conventional means, such as bolts 50. Since tip 28' is adapted to scape inside walls 52 of cylinder 12, it is preferably coated with a commercially available low-friction, wear-resistant coating such at tungsten carbide. Blades 28 are mounted on the portion of shaft 30 which spans chamber 12. Shaft 30 has bushing 32 keyed thereto by means of keys 34. Blades 28 are fixed to bushing 32 by conventional means, such as welding. Shaft 30 is supported by journals 44 for rotation, as illustrated. Shaft 30 is driven through belts, not shown, by a conventional 40 h.p. electric motor, not shown, which can rotate shaft 30 and first blades 28 at approximately 1200 r.p.m.

Blades 46 are mounted to the portion of shaft 30 which spans gas plenum chamber 14. Blades 46 are mounted in the same manner as blades 28. Blades 46 have a larger diameter than blades 28, but are not adapted to scrape the inside walls 48 of cylinder 14. The greater diameter of blades 46 causes a lower static pressure than that caused by blades 28, causing the steam to be pulled from chamber 12 through port 18 and causing a neutral or slight negative presure at fiber discharge 24. The steam is then discharged from chamber 14 through port 26.

In a typical separator, chamber 12 is 12 inches wide and has a radius of 18 inches; blades 28 are 10 inches wide, have an 18-inch radius and rotate at a speed of 1200 r.p.m. Chamber 14 is 6 inches wide and blades 46 therein have a 20-inch radius and are approximately 5 inches wide. Such a unit could handle two tons of fiber per hour weighing three or four pounds per cubic foot.

The foregoing has described a novel separator which separates fiber from steam by imparting a centrifugal force to the entertainment of fiber and steam, separating out the steam and fibers so that the fibers leave at one exit and the steam at another exit with no substantial pressure or vacuum at the fiber discharge outlet.

While I have described a certain preferred embodiment of my invention, it will be understood that it may otherwise by embodied within the scope of the following claims.

What is claimed:

1. A separator for separating the solid from the gas in an entrainment of solid and gas, comprising:
    (a) a closed housing, said housing comprised of first and second axially aligned cylindrical chambers with chamber dividing wall means therebetween;
    (b) rotor means extending axially through said housing and said first and second chambers;
    (c) first blade means fixably mounted on said rotor means, said first blade means extending axially on said rotor means within said first chamber, said first blade means being constructed and arranged to approach contact with the inner cylindrical wall of said first chamber;
    (d) second blade means fixably mounted on said rotor means, said second blade means extending axially on said rotor means within said second chamber;
    (e) drive means for rotating said rotor means and said first and second blade means;
    (f) entrance means for charging the entrainment into said first chamber substantially tangent to the circumferential path of travel of said first blade means;
    (g) discharge means in said first chamber for discharging solids separated from the entrainment, said discharge means being substantially tangent to the circumferential path of travel of said first blade means;
    (h) port means located centrally in said chamber dividing wall means for communicating entrainment gas in said first chamber with said second chamber; and
    (i) exit means in said second chamber for discharging said entrainment gas.

2. The separator of claim 1 wherein said second chamber and said second blade means have a radius greater than said first chamber and said first blade means.

3. The separator of claim 2 wherein said exit means for said entrainment gas is substantially tangent to the circumferential path of travel of said second blade means in said second chamber.

4. The separator of claim 3 wherein said first blade means in wider than said second blade means.

5. The separator of claim 4 wherein said first blade means substantially spans the width of said first chamber and said second blade means substantially spans the width of said second chamber.

6. The separator of claim 5 wherein said port means is dimensioned smaller relative to said solids discharge means.

7. The separator of claim 1 wherein said first blade means is constructed and arranged to receive replaceable tips comprised of a low-friction wear-resistant material.

8. The separator of claim 1 wherein said drive means for rotating said rotor means is constructed and arranged to rotate said rotor means at speeds above 1000 r.p.m.

* * * * *